United States Patent
Sommer et al.

(10) Patent No.: US 12,455,021 B2
(45) Date of Patent: Oct. 28, 2025

(54) PIPE FASTENER

(71) Applicant: SOMA GmbH & Co. KG, Dotternhausen (DE)

(72) Inventors: Frank Sommer, Balingen (DE); Andreas Massold, Balingen (DE)

(73) Assignee: SOMA GmbH & Co. KG, Dotternhausen (DE)

( * ) Notice: Subject to any disclaimer, the term of this patent is extended or adjusted under 35 U.S.C. 154(b) by 0 days.

(21) Appl. No.: 18/273,775

(22) PCT Filed: Dec. 2, 2021

(86) PCT No.: PCT/EP2021/083879
§ 371 (c)(1),
(2) Date: Jul. 23, 2023

(87) PCT Pub. No.: WO2022/161666
PCT Pub. Date: Aug. 4, 2022

(65) Prior Publication Data
US 2024/0183465 A1  Jun. 6, 2024

(30) Foreign Application Priority Data
Jan. 28, 2021 (EP) .................................. 21154084

(51) Int. Cl.
*F16L 3/13* (2006.01)
*F16L 3/22* (2006.01)

(52) U.S. Cl.
CPC ............... *F16L 3/13* (2013.01); *F16L 3/222* (2013.01)

(58) Field of Classification Search
CPC ... F16L 3/12; F16L 3/222; F16L 3/221; F16L 3/22; F16B 7/0433; H02G 3/32
USPC .................................................. 248/72, 68.1
See application file for complete search history.

(56) References Cited

U.S. PATENT DOCUMENTS

| | | | | |
|---|---|---|---|---|
| 4,114,241 A | * | 9/1978 | Bisping | F16B 2/22 248/68.1 |
| 4,306,697 A | * | 12/1981 | Mathews | F16L 3/222 248/68.1 |
| 6,109,569 A | * | 8/2000 | Sakaida | F16L 3/222 248/62 |
| 8,875,743 B2 | * | 11/2014 | Persaud | F16L 3/245 248/214 |

(Continued)

FOREIGN PATENT DOCUMENTS

| | | |
|---|---|---|
| DE | 2624333 A1 | 12/1977 |
| EP | 1744087 A1 | 1/2007 |
| WO | 2017032764 A1 | 3/2017 |

OTHER PUBLICATIONS

International Search Report for International Application No. PCT/EP2021/083879 Dated Feb. 22, 2022.

(Continued)

*Primary Examiner* — Christopher Garft
(74) *Attorney, Agent, or Firm* — Renner, Otto, Boisselle & Sklar, LLP

(57) ABSTRACT

A pipe clip that is designed with identical L-shaped fingers on opposite sides, serving as connecting devices, which can be connected, by pivoting, to pipe clips that bear on one another with the sides thereof, so that a row of pipe clips can be formed, of which only every second, third, or fifth has to be screwed to, for example, a wall or ceiling.

8 Claims, 10 Drawing Sheets

(56) References Cited

U.S. PATENT DOCUMENTS

| | | | |
|---|---|---|---|
| 2006/0108482 A1* | 5/2006 | Konrad | F16B 2/22 248/74.2 |
| 2013/0053812 A1* | 2/2013 | Lehmann | F16L 3/222 137/315.01 |
| 2014/0053938 A1* | 2/2014 | Persaud | F16L 3/14 248/62 |
| 2018/0266588 A1* | 9/2018 | Netke | F16L 55/02 |

OTHER PUBLICATIONS

Written Opinion for International Application No. PCT/EP2021/083879 Dated Feb. 22, 2022.

* cited by examiner

PIPE FASTENER

TECHNICAL FIELD OF THE INVENTION

The invention relates to a pipe fastener for fastening a pipe to an attachment base having the features described herein.

A pipe fastener is, for example, a pipe clamp or a pipe clip, which is to say something to or in which a pipe, a conduit, a cable, a hose, a rod or the like can be fastened. The pipe fastener according to the invention can be attached, for example, to a wall, a post or a ceiling, serving as the attachment base, so that the pipe or the like can be fastened to the attachment base by way of the pipe fastener.

BRIEF DESCRIPTION OF THE RELATED ART

U.S. Pat. No. 6,109,569 describes a pipe clip comprising a connecting clip on one side, and a connecting foot on an opposite side, of a base portion of the pipe clip. By snapping the connecting foot of a pipe clip in the lateral direction, or by inserting this in a longitudinal direction, into the connecting clip of a further pipe clip, essentially any number of pipe clips can be detachably connected to one another. Connected pipe clips are disposed next to one another such that axes of pipes clipped into the pipe clips extend parallel to one another.

International patent application WO 2017/032 764 A1 describes a pipe connector comprising two pipe clips that are detachably connected to one another. For connecting, one of the two pipe clips comprises a laterally projecting connecting device, which resembles a stalk including the teeth of a key. The other pipe clip has a keyhole-shaped through-hole, serving as the mating connecting device, which extends through a base portion of the pipe clip transversely to the clip. For connecting, the connecting device of the one pipe clip is inserted so far through the mating connecting device of the other pipe clip that the "teeth" exit on the opposite side and provide locking by a 90° rotation. The connected pipe clips connect two pipes snapped into the pipe clips to one another so as to perpendicularly extend past one another.

It is the object of the invention to provide a pipe fastener that can be connected on both sides to a further, identically constructed pipe fastener, which do not undesirably detach from one another.

SUMMARY OF THE INVENTION

The pipe fastener according to the invention comprises a connecting device and a mating connecting device on an opposite side so that the connecting device can be brought into engagement in a form-locked manner with the mating connecting device of a further, identically constructed pipe fastener so as to connect the two pipe fasteners to one another. The connecting device and the mating connecting device can also be interpreted as parts of a form-fit coupling, which, when connected to one another, engage one another in a form-locked manner so as to, preferably rigidly, connect the two pipe fasteners to one another. Essentially, any number of pipe fasteners can be connected to one another, wherein mutually connected pipe fasteners are disposed in a preferably straight row next to one another so that axes of pipes that are fastened to or in the pipe fasteners extend parallel to one another. If the pipes have the same diameter or, generally speaking, the same cross-section, the parallel axes thereof are situated in one plane. If the pipes have differing diameters or cross-sections, the parallel axes thereof are not necessarily situated in a shared plane. In the latter case, the parts of the pipe fasteners used for fastening the pipes are not necessarily identical, but the parts of the pipe fasteners used for connecting to further pipe fasteners, in particular the connecting devices and the mating connecting devices, are identically constructed.

According to the invention, connected pipe fasteners cannot be detached from one another or can only be detached by pivoting relative to one another. The term "only" expresses that connected pipe fasteners must be pivoted relative to one another for detachment. An additional translatory movement of the pipe fasteners is possible, but not mandatory. The connection of two pipe fasteners is not a screw joint allowing a rotation of more than 360°. For detaching, it suffices when the pipe fasteners are pivoted relative to one another by, for example, 90°. Smaller or larger pivot angles are possible, wherein the pivot angle is preferably not more than 180°. The connecting device and the mating connecting device can, for example, be implemented in a manner comparable to a bayonet catch, wherein, deviating from a bayonet catch, connection and detachment can also be possible without insertion and pulling-out. The pipe fasteners are preferably connected by a motion/motions reverse to that/those used for detachment. However, embodiments comprising, for example, a detent connection, are also possible, which can be connected by joining without pivoting, but can only be detached by pivoting or, in embodiments of the invention, cannot be detached at all. The connecting device and the mating connecting device preferably connect the pipe fasteners rigidly or, based on material or design elasticity, elastically to one another.

Pipe fasteners according to the invention can be used to fasten pipes or the like parallel next to one another at, for example, a wall or beneath a ceiling. If the pipe fasteners are connected to one another, not every pipe fastener has to be attached, but rather it suffices to attach one or several of the pipe fasteners to the wall, ceiling or the like, which hold the other pipe fasteners. This is particularly advantageous when holes have to be drilled into the wall, ceiling or, generally speaking, the attachment base for attaching the pipe fasteners, and the pipe fasteners are screwed in place. Since the pipe fasteners cannot be detached from one another, or can only be detached by pivoting, the pipe fasteners do not inadvertently detach from one another or, in any case, the risk of inadvertent detachment of the pipe fasteners is low.

For detaching connected pipe fasteners, the connecting device and the mating connecting device, in one embodiment of the invention, are configured so as to only be detachable by pivoting relative to one another about an axis tangential with respect to the pipe axis of a pipe fastened to one of the pipe fasteners.

In a preferred embodiment of the invention, the connecting device and the mating connecting device have an identical design. This embodiment of the invention allows identically constructed pipe fasteners to be used, during the connection of which it does not matter which sides of the pipe fasteners face one another since the connecting devices are identical on both sides of the pipe fasteners.

For an attachment to a wall, ceiling or similar attachment base, an embodiment of the invention provides a screw hole, for example a through-hole, for example in a base portion of the pipe fastener, for attachment by means of an inserted screw. An axis of the screw hole extends, in particular, radially with respect to the pipe axis of a pipe fastened to the pipe fastener, or possibly parallel to such a radial. It is also possible for the axis of the screw hole to extend radially or tangentially with respect to the axis about which the connected pipe fasteners must be pivoted with respect to one another so as to detach these from one another.

So as to create the connecting device and the mating connecting device, an embodiment provides a finger on the one side of the pipe fastener, serving as a connecting device or as part of the connecting device, and/or an undercut on the opposite side of the pipe fastener, serving as a mating connecting device or as part of the mating connecting device. The undercut can be an inner surface of a wall on the opposite side of the pipe fastener. Pipe fasteners to be connected are placed against one another with the sides that include the finger or the undercut, and are pivoted relative to one another, so that the finger latchingly engages the undercut and connects the pipe fasteners. If the connecting device and the mating connecting device are identically designed, the pipe fasteners include a finger and an undercut on opposite sides. When the pipe fasteners are placed against one another with the sides thereof and pivoted relative to one another, the finger of the one pipe fastener latchingly engages the undercut of the other pipe fastener, and vice versa.

According to a refinement of the invention, the finger of the connecting device is located on a side of a radial center plane of the pipe fastener radially with respect to the axis of a pipe fastened to the pipe fastener, which is to say the finger does not protrude beyond the radial center plane of the pipe fastener.

An embodiment of the invention provides an L-shaped finger, as viewed looking at the side of the pipe fastener on which the connecting device is present. A side of the leg of the "L" can be flush with an attachment side of the pipe fastener by way of which the pipe fastener is intended to be attached to a planar surface of the attachment base. A leg of the "L" parallel to the attachment side can transition into the pipe fastener with an angled section perpendicular to a plane that is spanned by the "L." As a result, the L-shaped finger can be fastened at a distance from the side of the pipe fastener on which the connecting device is present. The distance between the finger and the side of the pipe fastener is in particular as large as the wall thickness of the pipe fastener on the opposite side, the inner surface of which forms the undercut of the mating connecting device which the finger latchingly engages when two pipe fasteners are connected to one another. One end of a leg of the L-shaped finger can have a chamfer. The features of this paragraph can be implemented individually or in any arbitrary combination in embodiments of the invention.

The pipe fastener is preferably a pipe clip, which is to say the pipe fastener is designed so that a pipe or the like can engage therein by snap action for fastening.

All of the features mentioned in the description and/or shown in the drawings can be implemented individually alone or in any arbitrary combination in embodiments of the invention. Embodiments of the invention that do not comprise all, but only some of the features of a claim, including of the independent claim, are possible.

BRIEF DESCRIPTION OF THE DRAWINGS

The invention will be described hereafter in greater detail based on one exemplary embodiment shown in the drawings. In the drawings.

DETAILED DESCRIPTION OF THE EMBODIMENTS

Figure 1:
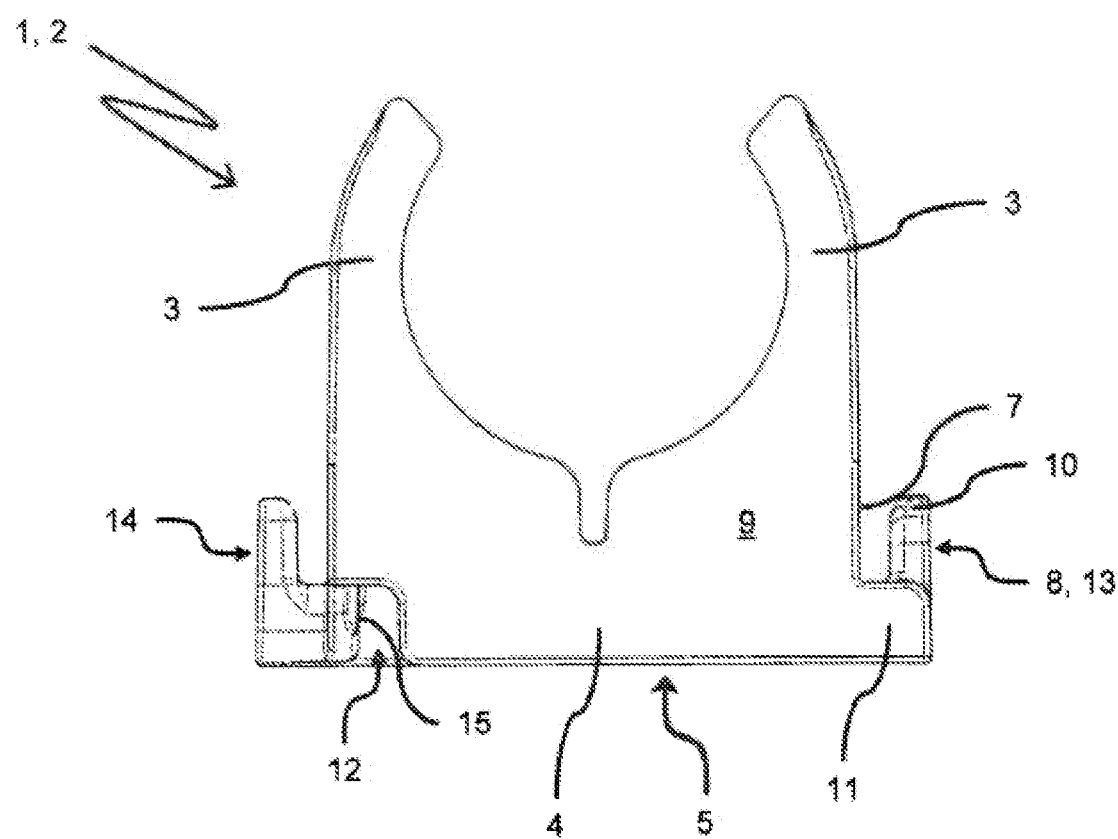
FIG. 1 shows a view of the pipe fastener according to the invention.
Figure 2:
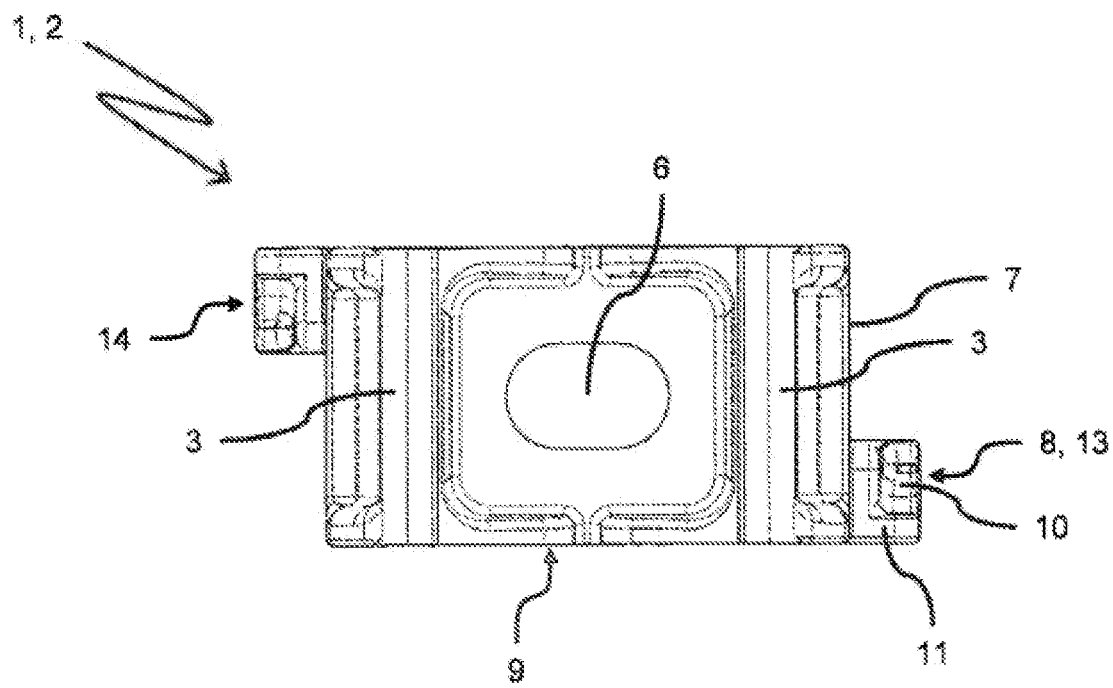
FIG. 2 shows the pipe fastener from FIG. 1 from above.
Figure 3:
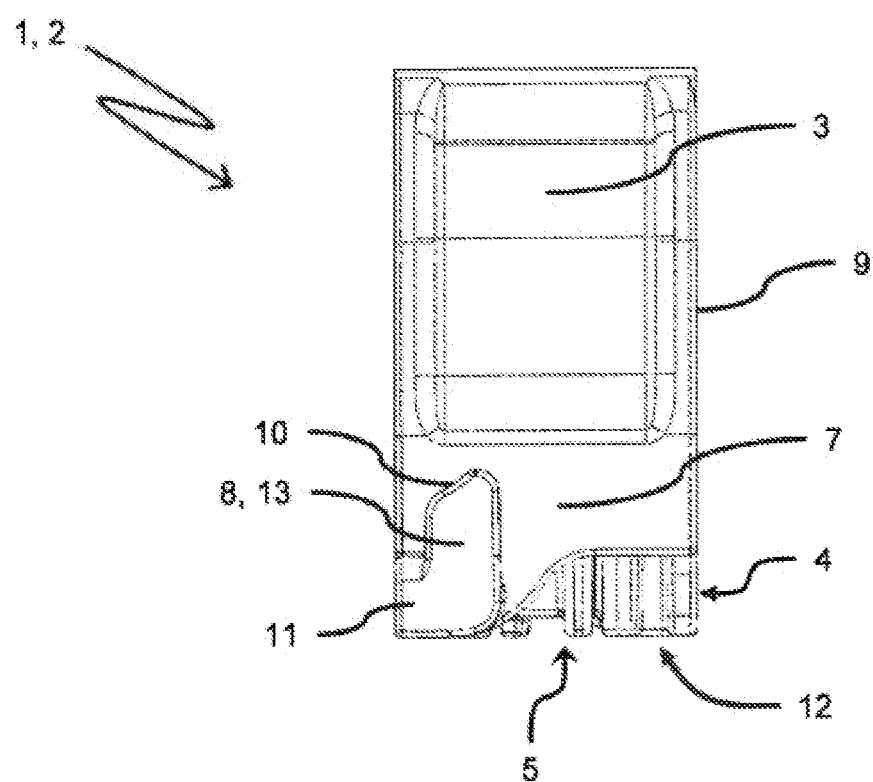
FIG. 3 shows the pipe fastener from FIGS. 1 and 2 in a side view.
Figure 4:
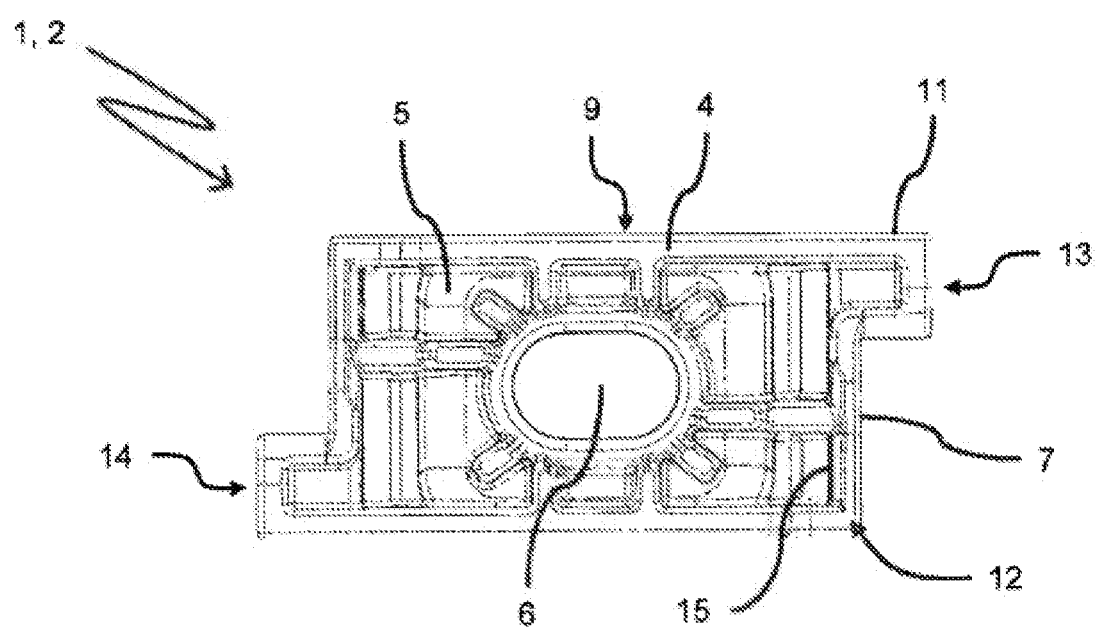
FIG. 4 shows the pipe fastener from FIGS. 1 to 3 from beneath.
Figure 5:
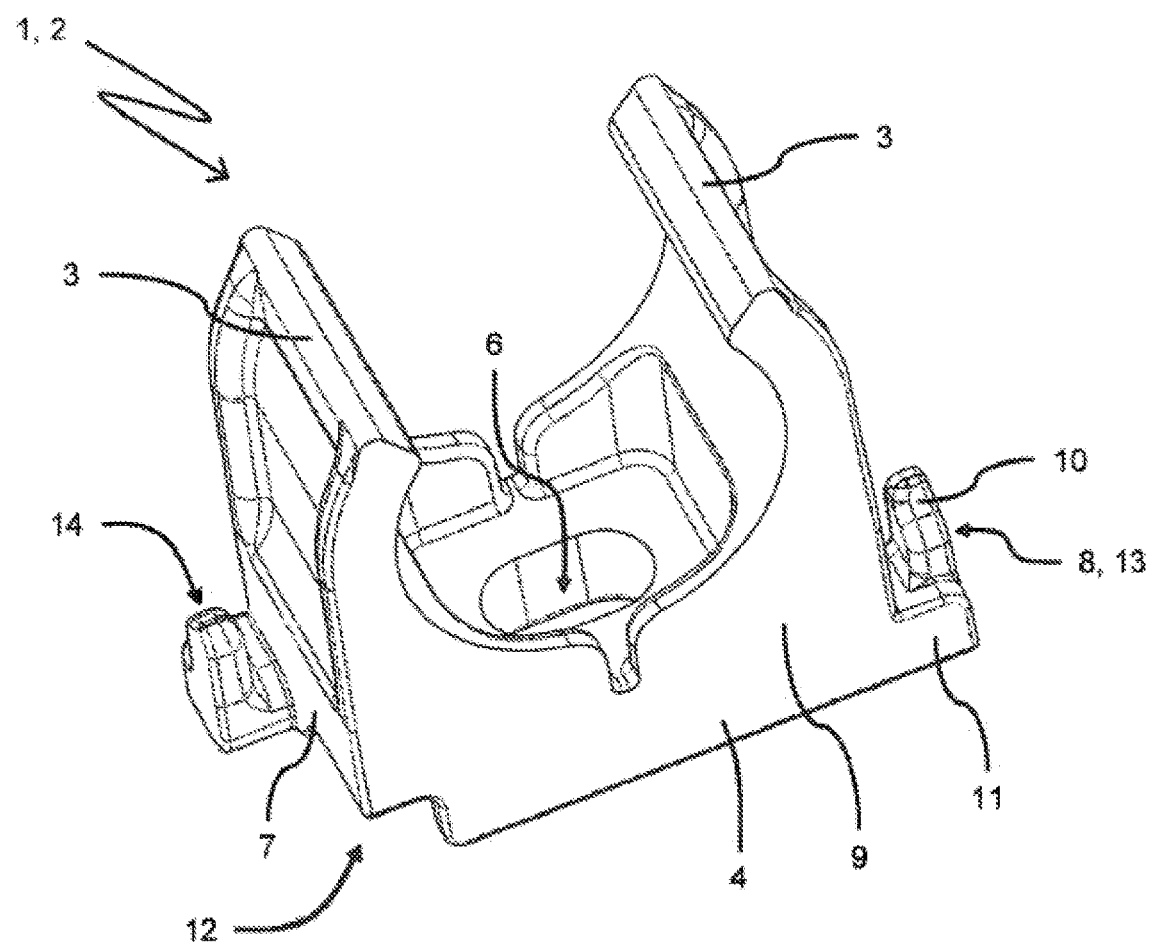
FIG. 5 shows the pipe fastener from FIGS. 1 to 4 in a perspective illustration.

The pipe fastener 1 according to the invention shown in FIGS. 1 to 5 is produced in one piece by injection molding from plastic material, neither the production by injection molding nor the production from plastic material nor the one-piece design being mandatory for the invention. In the exemplary embodiment, the pipe fastener 1 is designed as a pipe clip 2, which is to say this comprises two arc-shaped spring legs 3 in the exemplary embodiment, which enclose a pipe (not shown) that is to be fastened and is snap-fit between the two spring legs 3 over more than 180° so as to be held by way of force fit to prevent the pipe from falling out radially. For fastening, the pipe, which is not shown, is pushed between the two spring legs 3 ("snapped-in"), wherein the two spring legs 3 elastically and resiliently widen to such an extent that the pipe moves therebetween. Snapping out by pulling the pipe out in the opposite direction is possible. It is also possible to snap a conduit, a cable or another elongated object between the two spring legs 3 of the pipe fastener 1. The shape of the spring legs 3 can be adapted to cross-sections other than circular cross-sections (not shown).

The pipe fastener 1 has an approximately cuboid, hollow base portion 4, which is open on an attachment side 5. The two arc-shaped spring legs 3 project symmetrically from a side of the base portion 4 which is located opposite the attachment side 5.

An elongated hole, serving as a screw hole 6, in the base portion 4 allows the pipe fastener 1 to be screwed by way of a screw (not shown), which is placed through the screw hole 6, to a wall, ceiling or, generally speaking, to an attachment base, with the attachment side 5 of the pipe fastener 1 bearing on the attachment base.

On each of two mutually opposing sides 7, which perpendicularly adjoin the attachment side 5 and extend parallel to a pipe axis of a pipe snapped between the spring legs 3, the pipe fastener 1 has a finger 8, which forms a connecting device 9 or is part of a connecting device 9. As viewed looking perpendicularly at the side 7 of the pipe fastener 1, the finger 8 is L-shaped, wherein the "L" is disposed parallel to the side 7 of the pipe fastener 1 and spaced apart from the side 7 at a distance that corresponds to a wall thickness of the side 7 of the pipe fastener 1 in the region of the base portion 4, or in a region adjoining the attachment side 5.

A short leg of the L-shaped finger 8 extends parallel to the attachment side 5 of the pipe fastener 1 and has a side that is flush with the attachment side 5.

As viewed looking at the side 7 of the pipe fastener 1, the L-shaped finger 8 is approximately ⅓ as wide as the side 7.

A long leg of the L-shaped finger 8 extends upwardly perpendicular to the attachment side 5 of the pipe fastener 1, which is to say in the direction of the one spring leg 3 on this side 7 of the pipe fastener 1. The long leg of the L-shaped finger 8 extends parallel to the side 7 and parallel to an end face 9 of the pipe fastener 1, which perpendicularly adjoins the side 7 and the attachment side 5.

As viewed perpendicularly at the side 7 of the pipe fastener 1, the long leg of the L-shaped finger 8 is offset inwardly, which is to say in the direction of an opposite end face 9 of the pipe fastener 1, in relation to the end face 9 by a wall thickness of the end face 9.

A free end of the long leg of the L-shaped finger 8 lying furthest away from the attachment side 5 has a chamfer 10, which faces away from the attachment side 5 and faces the end face 9.

A short leg of the L-shaped finger 8 transitions with the angled section 11 in one piece into the side 7 of the pipe fastener 1. The angled section 11 is perpendicular to an area spanned by the "L" and flush with the end face 9 of the pipe fastener 1.

On the end face 9 located opposite the end face 9 at which the angled section 11 of the L-shaped finger 8 is located, the side 7 has a recess 12 on the attachment side 5. Perpendicular to the attachment side 5, the recess 12 is as high as the angled section 11 of the finger 8. The recess has an edge that is parallel to the attachment side 5 and extends in a center of the side 7 in an S-shaped curved manner to the attachment side 5. In the end face 9 located opposite the angled section 11, the recess is as wide as the angled section 11 projects from the side 7.

The L-shaped fingers 8, including the angled sections 11 thereof and the recesses 12 thereof, are identical on the two opposite sides 7 of the pipe fastener 1, which is to say as viewed perpendicular at the respective side 7, the L-shaped fingers 8 and the recesses 12, in the exemplary embodiment, are identical and not laterally reversed. As a result, the L-shaped fingers 8 and the recesses 12 of pipe fasteners 1 that are disposed next to one another, with the sides 7 thereof bearing on one another, are laterally reversed.

The L-shaped fingers 8 and the recesses 12 at the opposite sides 7 of the pipe fastener 1 form a connecting device 13 and an identical mating connecting device 14, by way of which multiple pipe fasteners 1 can be connected next to one another in a straight row in a form-locked manner, with the sides 7 thereof bearing on one another.

Figure 6:
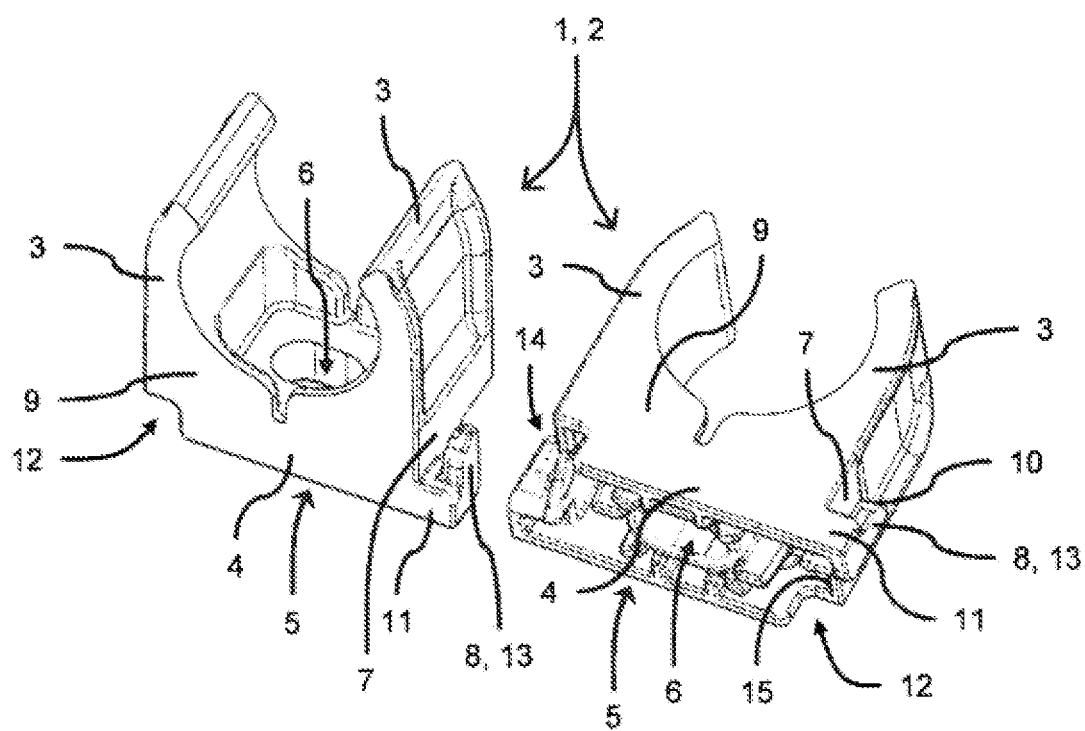
FIGS. 6 to 8 show two of the pipe fasteners from FIGS. 1 to 5 during assembly and connection in consecutive steps.
Figure 7:
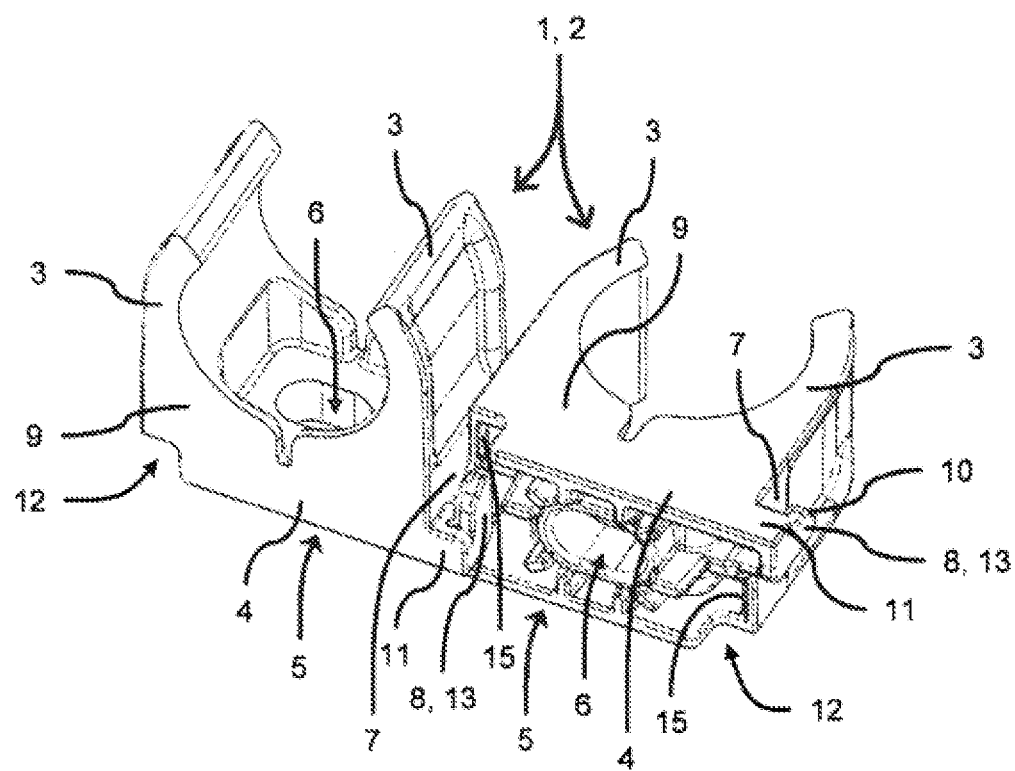
Figure 8:
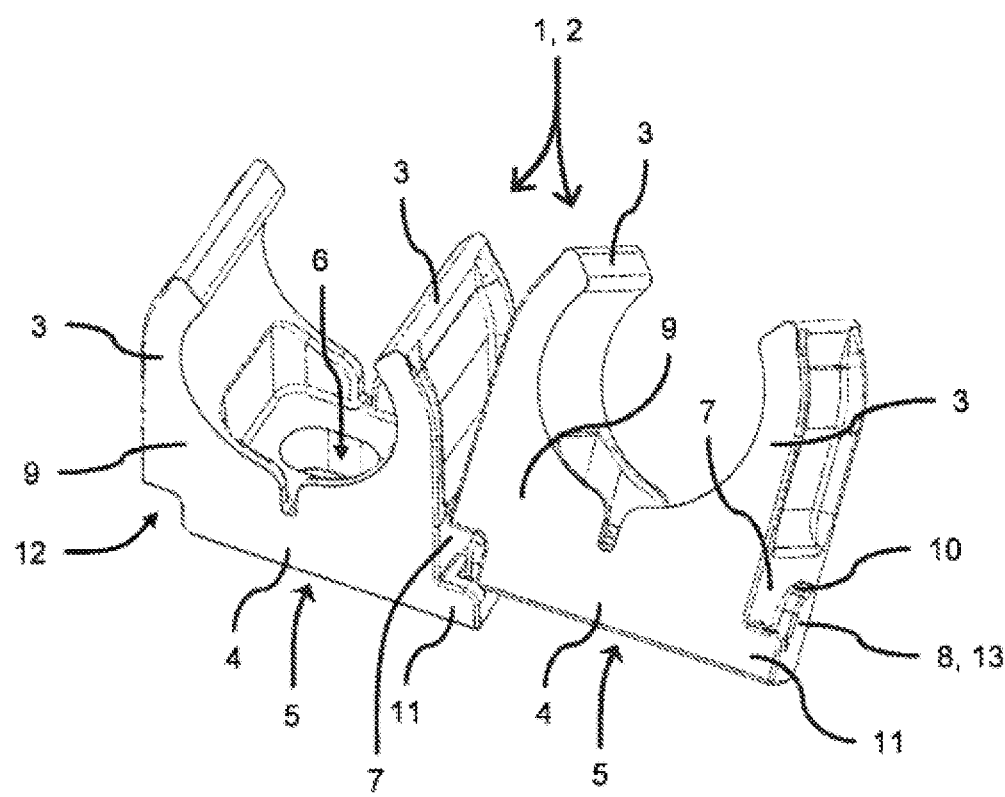

FIGS. 6 to 8 show consecutive steps of connecting two identically constructed or identical pipe fasteners 1 according to the invention: for connecting, two pipe fasteners 1 are disposed so as to be pivoted 90° relative to one another so that the sides 7 thereof including the L-shaped fingers 8 and the recesses 12 face one another. Pivoted 90° relative to one another shall be understood to mean that the attachment sides 5, the end faces 9 and the spring legs 3 of the two pipe fasteners 1 are pivoted 90° relative to one another. The two pipe fasteners 1 are moved toward one another until the sides 7 thereof bear on one another. This position is shown in FIG. 7. Then, the two pipe fasteners 1 are pivoted 90° relative to one another so that the attachment sides 5 thereof and end faces 9 are parallel and flush with one another, which is to say in each case in one plane with one another. During pivoting, the long legs of the L-shaped fingers 8 of the two pipe fasteners 1 latchingly engage the side 7 of the respective adjacent pipe fastener 1, as is apparent in FIG. 8. Insides of the sides 7 of the base portions 8 of the pipe fasteners 1 form undercuts 15, which are part of the connecting devices 13 and of the identical mating connecting devices 14 and which are in each case alternately latchingly engaged by the long leg of the L-shaped finger 8 of an adjacent pipe fastener 1 when the pipe fasteners 1 are connected.

Figure 9:
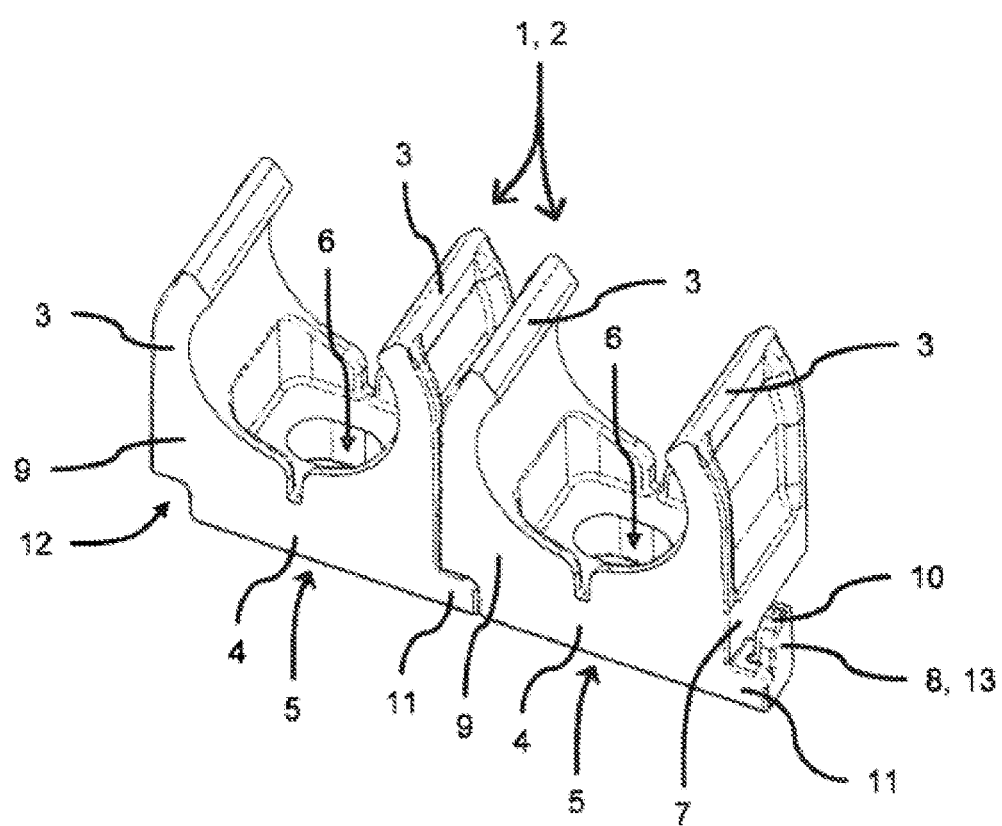
FIGS. 9 and 10 show the two pipe fasteners from FIGS. 6 to 9 when connected.
Figure 10:
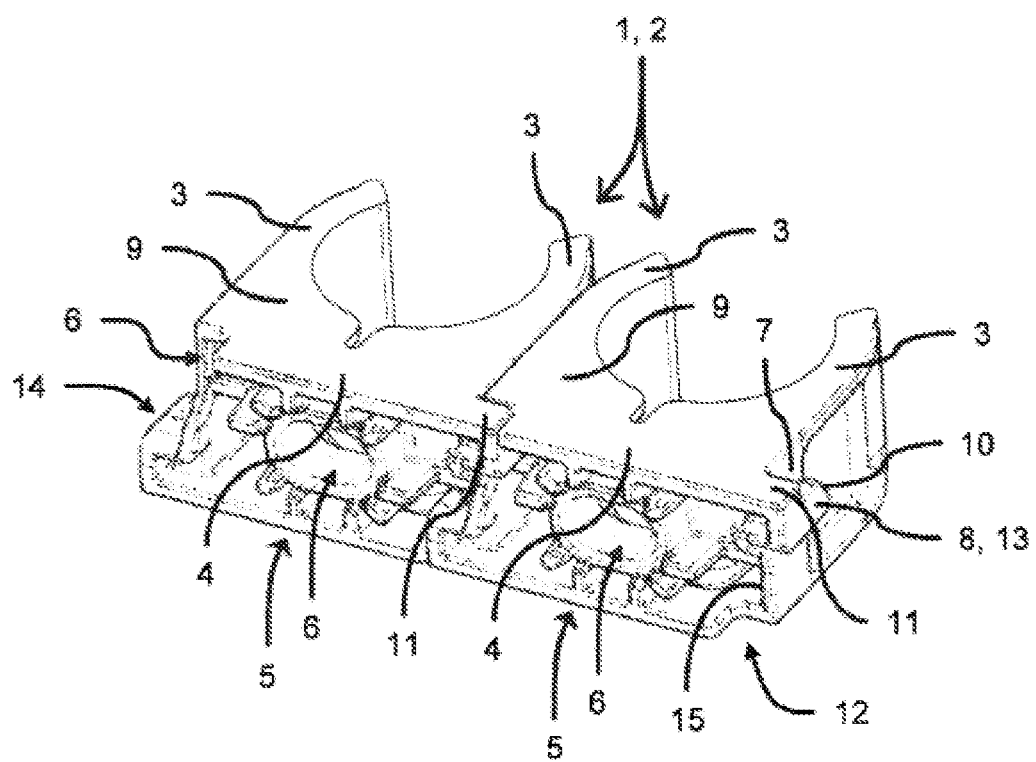

FIGS. 9 and 10 show two pipe fasteners 1 according to the invention that are connected by form fit of the connecting device 13 thereof with the identical mating connecting device 14. Generally, any number of pipe fasteners 1 can be connected to one another in a form-locked manner so as to be disposed in a straight row, with flush attachment sides 5 and flush end faces 9 next to one another. Pipe axes of pipes, which are not shown, and are snapped between the spring legs 3 of the connected pipe fasteners 1, extend parallel in a shared plane that is parallel to the attachment side 5.

So as to detach the pipe fasteners 1 from one another, these must be pivoted 90° relative to one another in a manner opposite that of the connection process. As a result of being connected to one another, not all pipe fasteners 1 have to be attached to the attachment base, but it suffices, for example, to attach every second, third or fifth pipe fastener 1. It is also possible to connect pipe fasteners 1 for differing pipe diameters, the connecting devices 13 and mating connecting devices 14 of which are identical and designed as described and as illustrated (not shown).

The invention claimed is:

1. A pipe fastener for fastening a pipe to an attachment base along an attachment side, the pipe fastener comprising a connecting device, which can be connected to a mating connecting device of a further pipe fastener by form fit of the connecting device with the mating connecting device, whereby the pipe fasteners can be connected to one another so as to be disposed next to one another, pipe axes at the pipe fasteners of attached pipes extending parallel, and the pipe fastener comprising the connecting device on one side and a mating connecting device on an opposite side, so that a plurality of identically constructed pipe fasteners can be detachably connected to one another so as to be disposed next to one another in a straight row, pipe axes at the pipe fasteners of fastened pipes extending parallel, wherein the connecting device of the pipe fastener can be connected to the mating connecting device of the further pipe fastener by pivoting of the pipe fastener with respect to the further pipe fastener about a pivoting axis that is parallel to the attachment side of the pipe fastener and which pivoting axis is in a plane that is perpendicular to a pipe axis of a pipe that is fastened at the pipe fastener, and which connecting device can be detached from the mating connecting device by pivoting of the pipe fastener with respect to the further pipe fastener about the same pivoting axis, wherein the mating connecting device is identical to the connecting device when viewed from their respective sides, wherein the connecting device comprises a finger on a side surface that is parallel to the pipe axis of a pipe fastened to the pipe fastener, and the mating connecting device has an undercut on an opposite side, and that the finger can latchingly engage the undercut of the mating connecting device of the further pipe fastener by the pivoting of the pipe fastener with respect to the further, identically constructed pipe fastener, and wherein the finger has a chamfer at a free end.

2. The pipe fastener according to claim 1, wherein the pipe fastener has a screw hole for the attachment to the attachment base.

3. The pipe fastener according to claim 2, wherein an axis of the screw hole extends radially with respect to the pipe axis of a pipe fastened to the pipe fastener and/or radially or tangentially with respect to the axis about which the connected pipe fasteners can be pivoted relative to one another for detachment.

4. The pipe fastener according to claim 1, wherein the finger is disposed on a side of a radial center plane of the pipe fastener radial with respect to the pipe axis of a pipe fastened to the pipe fastener.

5. A pipe fastener for fastening a pipe to an attachment base, the pipe fastener comprising a connecting device, which can be connected to a mating connecting device of a further pipe fastener by form fit of the connecting device with the mating connecting device, whereby the pipe fasteners can be connected to one another so as to be disposed next to one another, pipe axes at the pipe fasteners of attached pipes extending parallel, and the pipe fastener comprising the connecting device on one side and a mating connecting device on an opposite side, so that a plurality of identically constructed pipe fasteners can be detachably connected to one another so as to be disposed next to one another in a straight row, pipe axes at the pipe fasteners of fastened pipes extending parallel, wherein the connecting device of the pipe fastener can be connected to the mating connecting device of the further pipe fastener by pivoting of the pipe fastener with respect to the further pipe fastener and can be detached from the mating connecting device by pivoting of the pipe fastener with respect to the further pipe fastener, wherein the mating connecting device is identical to the connecting device when viewed from their respective sides, wherein the connecting device comprises a finger on a side surface that is parallel to the pipe axis of a pipe fastened to the pipe fastener, and the mating connecting device has an undercut on an opposite side, and that the finger can latchingly engage the undercut of the mating connecting device of the further pipe fastener by the pivoting of the pipe fastener with respect to the further, identically constructed pipe fastener, and wherein the finger is L-shaped, as viewed looking at the side of the pipe fastener on which the connecting device is located.

6. The pipe fastener according to claim 1, wherein the finger transitions with an angled section into the side of the pipe fastener which comprises the connecting device, so that the finger is spaced apart from the opposite side of the pipe fastener.

7. A pipe fastener for fastening a pipe to an attachment base, the pipe fastener comprising a connecting device, which can be connected to a mating connecting device of a further pipe fastener by form fit of the connecting device with the mating connecting device, whereby the pipe fasteners can be connected to one another so as to be disposed next to one another, pipe axes at the pipe fasteners of attached pipes extending parallel, and the pipe fastener comprising the connecting device on one side and a mating connecting device on an opposite side, so that a plurality of identically constructed pipe fasteners can be detachably connected to one another so as to be disposed next to one another in a straight row, pipe axes at the pipe fasteners of fastened pipes extending parallel, wherein the connecting device of the pipe fastener can be connected to the mating connecting device of the further pipe fastener by pivoting of the pipe fastener with respect to the further pipe fastener and can be detached from the mating connecting device by pivoting of the pipe fastener with respect to the further pipe fastener, wherein the mating connecting device is identical to the connecting device when viewed from their respective sides, wherein the connecting device comprises a finger on a side surface that is parallel to the pipe axis of a pipe fastened to the pipe fastener, and the mating connecting device has an undercut on an opposite side, and that the finger can latchingly engage the undercut of the mating connecting device of the further pipe fastener by the pivoting of the pipe fastener with respect to the further, identically constructed pipe fastener, and wherein the finger has a side that is flush with an attachment side of the pipe fastener.

8. The pipe fastener according to claim 1, wherein the pipe fastener has a recess, adjoining an attachment side, in the side that is part of the connecting device and/or of the mating connecting device.

* * * * *